(12) United States Patent
Chakra et al.

(10) Patent No.: US 10,592,076 B2
(45) Date of Patent: *Mar. 17, 2020

(54) USER INTERFACE DESIGN BASED ON VISUAL CHARACTERISTICS DETERMINED TO MITIGATE SENSITIVITY DETERIORATION

(71) Applicant: International Business Machines Corporation, Armonk, NY (US)

(72) Inventors: Al Chakra, Apex, NC (US); Gary Denner, County Meath (IE); Jonathan Dunne, County Waterford (IE); Liam Harpur, Dublin (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 288 days.

This patent is subject to a terminal disclaimer.

(21) Appl. No.: 15/480,490

(22) Filed: Apr. 6, 2017

(65) Prior Publication Data

US 2017/0212654 A1    Jul. 27, 2017

Related U.S. Application Data

(63) Continuation of application No. 14/877,020, filed on Oct. 7, 2015, now Pat. No. 10,152,209.

(51) Int. Cl.
*G06F 3/0484* (2013.01)
*G06F 8/38* (2018.01)
(Continued)

(52) U.S. Cl.
CPC .......... *G06F 3/0484* (2013.01); *G06F 3/0488* (2013.01); *G06F 8/20* (2013.01); *G06F 8/38* (2013.01)

(58) Field of Classification Search
CPC ........ G06F 8/38; G06F 3/0488; G06F 3/0418; G06F 11/07; G06F 11/22
See application file for complete search history.

(56) References Cited

U.S. PATENT DOCUMENTS

2008/0231604 A1* 9/2008 Peterson ............. G06F 3/04886
345/173
2009/0184935 A1* 7/2009 Kim ...................... G06F 3/0416
345/173

(Continued)

OTHER PUBLICATIONS

Appendix P, 2017.
List of all IBM Related Applications, Appendix P, 2019.

*Primary Examiner* — Abdullah Al Kawsar
*Assistant Examiner* — Kenny Nguyen
(74) *Attorney, Agent, or Firm* — Garg Law Firm, PLLC; Rakesh Garg; Robert Bunker

(57) ABSTRACT

For improving a future UI design, a set of data is analyzed. A data in a first subset of the set includes (i) a description of a UI layout including a description of a UI element in a first area of a touch-sensitive device, the first area having a below a level of sensitivity, the data, and (ii) a second area of the touch-sensitive device having a second sensitivity at least equal to the level of sensitivity. A characteristic of the UI element is extracted. A threshold number of data in the first subset include some UI element with the characteristic. For a first area in each data in the subset, the characteristic is determined to cause a sensitivity to reduce to below the level of sensitivity. Accordingly, an instruction causes a UI design tool to move a UI element in the future UI design to a second area.

9 Claims, 7 Drawing Sheets

(51) Int. Cl.
*G06F 3/0488* (2013.01)
*G06F 8/20* (2018.01)

(56) References Cited

U.S. PATENT DOCUMENTS

| | | | |
|---|---|---|---|
| 2012/0185788 A1* | 7/2012 | Fong | G06F 3/018 |
| | | | 715/765 |
| 2013/0091435 A1* | 4/2013 | Im | H04M 1/72563 |
| | | | 715/744 |
| 2013/0100037 A1* | 4/2013 | Mabie | G06F 3/0418 |
| | | | 345/173 |
| 2014/0019894 A1* | 1/2014 | Mitchell | G06F 3/0481 |
| | | | 715/765 |
| 2014/0320437 A1* | 10/2014 | Kang | G09G 5/373 |
| | | | 345/173 |
| 2015/0193074 A1* | 7/2015 | Cudak | G06F 3/0418 |
| | | | 345/173 |

\* cited by examiner

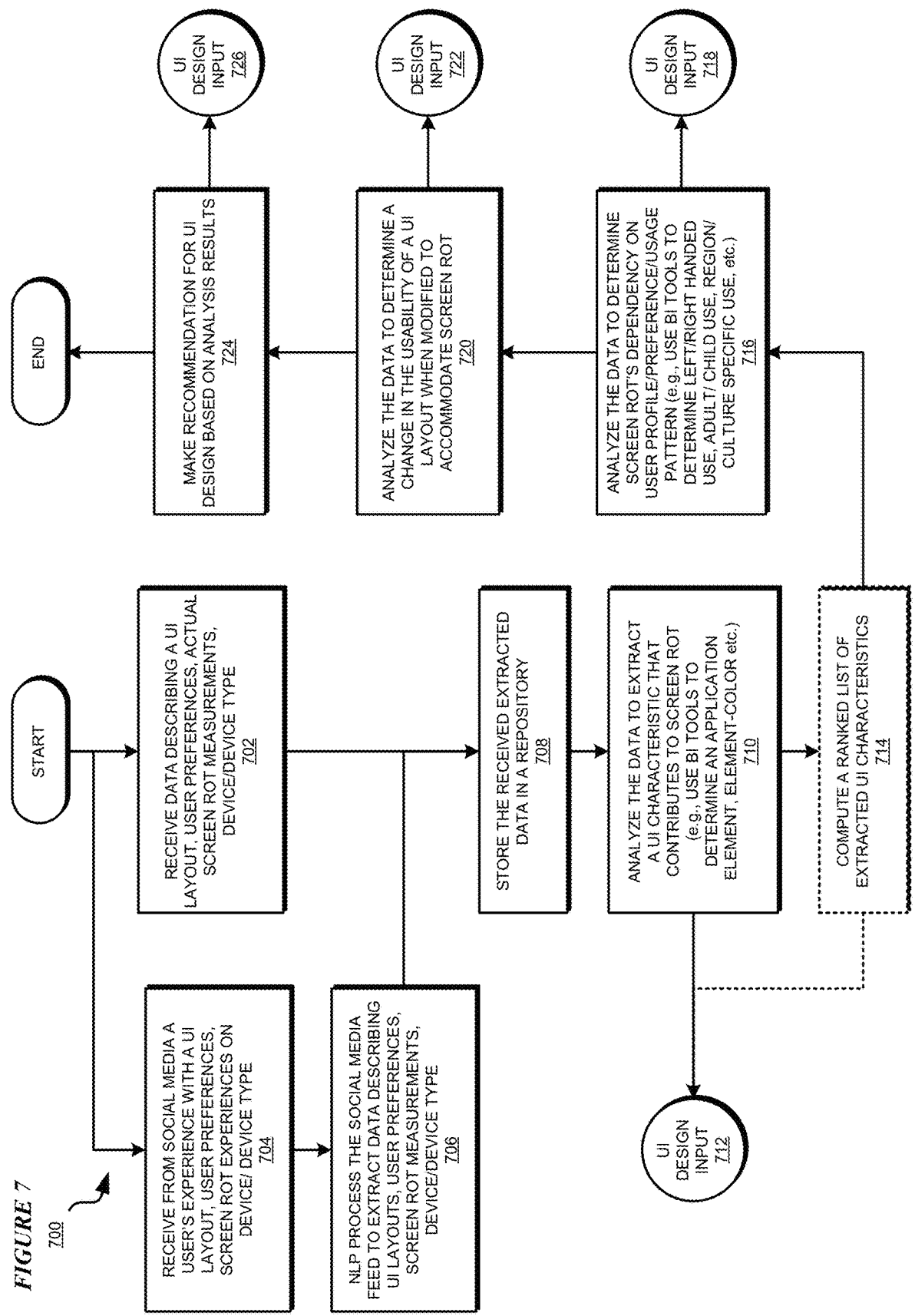

USER INTERFACE DESIGN BASED ON VISUAL CHARACTERISTICS DETERMINED TO MITIGATE SENSITIVITY DETERIORATION

TECHNICAL FIELD

The present invention relates generally to a method, system, and computer program product for assisting in the design of a user interface of an application. More particularly, the present invention relates to a method, system, and computer program product for user interface design to mitigate and reduce device deterioration.

BACKGROUND

A variety of user interface devices is available for presenting content to a user in a variety of ways. Some examples of such interface devices include, but are not limited to, screens enabled to accept touch-based inputs (touchscreen) and screens or boards capable of presenting content in Braille for visually impaired users, and the like.

Touching a surface invariably causes wear and tear of the surface. When that surface is a touchscreen, the wear and tear includes diminishing sensitivity of the touch-sensing elements build into the touchscreen over a period of use. Similarly, when the surface is a part of a Braille board, the wear and tear includes reduced height or feel of the Braille dots.

SUMMARY

The illustrative embodiments provide a method, system, and computer program product for user interface design to mitigate device deterioration. An embodiment includes a method for improving a future user interface (UI) design. The embodiment analyzes, using a processor and a memory of a data processing system, a set of data, a data in a first subset of the set of data including (i) a description of a UI layout that includes a description of a UI element positioned in a first area of a touch-sensitive device, the first area having a first sensitivity to touch, wherein the first sensitivity is below a level of sensitivity, the data, (ii) a second area of the touch-sensitive device, the second area having a second sensitivity to touch, wherein the second sensitivity is at least equal to the level of sensitivity. The embodiment extracts a characteristic of the UI element, wherein a threshold number of data in the first subset include some UI element with the characteristic. The embodiment determines, for a first area in each data in the subset, that the characteristic causes a sensitivity to reduce to below the level of sensitivity. The embodiment constructs, responsive to the determining, an instruction for a UI design tool, the instruction causing the UI design tool to move a UI element in the future UI design to a second area.

Another embodiment includes a computer usable program product comprising a computer readable storage device including computer usable code for improving a future user interface (UI) design.

Another embodiment includes a data processing system for improving a future user interface (UI) design.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

FIG. 7 depicts a flowchart of an example process for user interface design to mitigate device deterioration in accordance with an illustrative embodiment.

DETAILED DESCRIPTION

Figure 1:
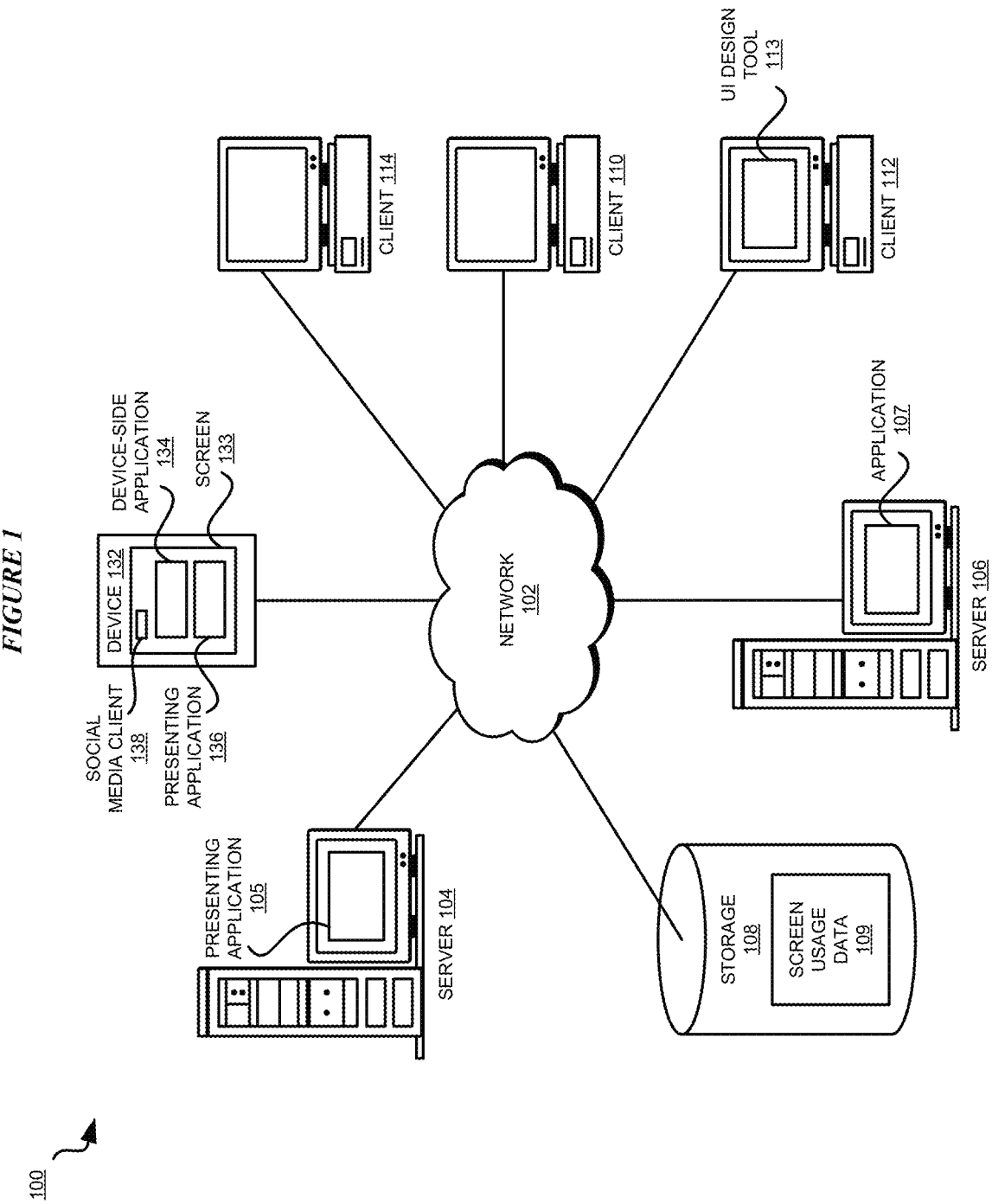
FIG. 1 depicts a block diagram of a network of data processing systems in which illustrative embodiments may be implemented.

The illustrative embodiments are described using a touchscreen as a non-limiting example of an interface device only for the clarity of the description and not to imply any limitations on the illustrative embodiments. From this disclosure, those of ordinary skill in the art will be able to adapt an embodiment to many other types of interface devices, including but not limited to Braille boards, and the same are contemplated within the scope of the illustrative embodiments.

Furthermore, hereinafter, any reference to a "screen" is a reference to a touchscreen unless expressly distinguished where used. A diminished sensitivity of a screen or a portion thereof to touch gestures is also referred to as screen rot.

Users are all too familiar with reduced sensitivity of touchscreens today. It is frustrating when certain parts of a touchscreen do not respond to a touch input as readily as other parts. Often, the touch gesture becomes a forceful pressing action on those less sensitive portions of the touchscreen. At the very least, the forceful pressing is a cause of frustration to the user, but often the result of the reduced sensitivity is much worse when those portions of the touchscreen fail to respond even to the forceful pressing gestures.

The illustrative embodiments recognize that often, portions of a screen become progressively less responsive with use. In some cases, a portion of a screen can be accidentally damaged, such as due to dropping the device or a liquid spill on the device, when portions of a screen become suddenly less responsive due to the damage.

In either case, the user is left with a partially functioning screen on which content continues to be presented. The illustrative embodiments recognize that when a portion of a screen has reduced or no sensitivity, and is marginally responsive or non-responsive to touch gestures, the user cannot sufficiently interact with the content presented in that portion of the screen. The illustrative embodiments recognize that insufficient ability to interact with the content at such a portion of the screen can cause errors in a transaction, incomplete process with a server, timeout during a session, and many other problems.

The illustrative embodiments further recognize that a user interface (UI), which places graphical or other content on a touchscreen, has to be designed with the possibility of screen rot in mind. For example, the illustrative embodiments recognize that if it can be known that certain devices place certain types of UI content in certain portions of the screen where screen rot occurs frequently, a UI design of an application should try to avoid using those portions. As another example, the illustrative embodiments recognize that if it can be known that different users use touchscreens differently or with different preferences, and such usage causes screen rot in different portions of the screen, a UI design of an application should try to implement alternative UI designs for different users to minimize screen rot in those portions.

The illustrative embodiments recognize that the presently, devices and users do not report screen rot information that can be analyzed for improving the UI designs of applications that use touchscreens. The illustrative embodiments also recognize that the presently available methods of UI design do not account for circumstances that contribute actual or potential screen rot on touchscreens.

The illustrative embodiments used to describe the invention generally address and solve the above-described problems and other problems related to UI design for touchscreens. The illustrative embodiments provide a method, system, and computer program product for user interface design to mitigate device deterioration.

An embodiment creates a map of a screen. For example, one embodiment overlays a virtual grid formed by virtual horizontal and vertical lines on the viewable or touch-sensitive screen area. Each cell in the grid covers a portion of the screen within which an embodiment measures the screen's sensitivity to touch gestures. For example, in a touchscreen that uses a resistive method of detecting a touch input, the embodiment measures the resistance change in the portion of the touchscreen corresponding to a grid cell. As another example, in a touchscreen that uses a capacitive method of detecting a touch input, the embodiment measures the change in capacitance resulting from a touch gesture in the portion of the touchscreen corresponding to a grid cell.

The embodiment compares the measured sensitivity, such as a measured change in resistance or capacitance, with a baseline or threshold sensitivity, such as with a threshold amount of change in resistance or capacitance that should occur in response to a touch gesture if the portion of the touch screen has the designed level of touch sensitivity.

The diminished sensitivity to touch gesture, or screen rot, can have several degrees. As a non-limiting example, suppose that the screen sensitivity can be classified into levels such as "excellent", "normal", "average", and "poor". Accordingly, in this example, the portion that has "excellent" sensitivity has no screen rot; the portion that has "normal" sensitivity has some screen rot that is undetectable or not perceivable by the user; the portion that has "average" sensitivity has some screen rot that is detectable or perceivable by the user but the portion is usable with some extra effort and frustration on the part of the user; and the portion that has "poor" sensitivity has screen rot that is detectable or perceivable by the user and the portion is unusable altogether or usable only with extraordinary effort and frustration on the part of the user.

The various embodiments are described using these example levels of sensitivity levels and the corresponding screen rot levels only for the clarity of the description. These examples of sensitivity levels and the corresponding screen rot levels are not intended to be limiting. From this disclosure, those of ordinary skill in the art will be able to conceive many other ways of gauging the sensitivity levels and the corresponding screen rot levels and the same are contemplated within the scope of the illustrative embodiments.

One embodiment regards the excellent level of sensitivity as a threshold amount of sensitivity, such as defined by a threshold amount of change in resistance or capacitance that should occur in response to a touch gesture if the portion of the touch screen has the level of touch sensitivity that the manufacturer has designed into the touchscreen. Accordingly, the normal level of sensitivity of a portion may indicate, for example, up to twenty percent less than the threshold amount of sensitivity in that portion, and corresponding to, for example, up to twenty percent screen rot in that portion. Similarly, the average level of sensitivity may be, for example, between eleven and thirty percent less than the threshold amount of sensitivity, and corresponding to, for example, between eleven and thirty percent screen rot. Similarly, the average level of sensitivity may be, for example, between twenty one and fifty percent less than the threshold amount of sensitivity, and corresponding to, for example, between twenty one and fifty percent screen rot. Similarly, the poor level of sensitivity may be, for example, fifty percent or more below the threshold amount of sensitivity, and corresponding to, for example, fifty one percent or more screen rot.

Once an embodiment measures the sensitivity (screen rot), the measured sensitivity information can be shared with the user via visual cues on the screen. For example, one embodiment visualizes the grid on the screen, i.e., presents the grid visibly to the user. Furthermore, the embodiment visibly presents the measured sensitivity information in the now-visible grids to the user.

For example, one embodiment shades a grid cell according to the measured sensitivity in that cell. The darker the shade of a cell, the poorer the sensitivity and correspondingly higher the screen rot in that cell, and vice versa. Another embodiment colors a grid cell differently according to the measured sensitivity in that cell. Different colors of a cell correspond to different levels of sensitivity and corresponding levels of screen rot in that cell. Any number of shades or colors can be used to indicate any number of levels of sensitivity and screen rot in this manner.

These examples of ways to represent sensitivity information are not intended to be limiting. From this disclosure, those of ordinary skill in the art will be able to conceive many other ways for a similar purpose and the same are contemplated within the scope of the illustrative embodiments. For example, different audible tones, different animations or animation speeds, different combinations of these various methods can similarly be used to represent sensitivity information about the various portions of an interface device, and the same are contemplated within the scope of the illustrative embodiments.

An embodiment is configured to avoid presenting content in those portions of a screen where the measured sensitivity is lower than a pre-determined threshold. This pre-determined threshold is different from the one or more thresholds used to measure the sensitivity levels. For example, the embodiment can be configured to not present any content, or not present that content which requires touch interaction, in a grid cell where the sensitivity is below sixty two percent, or below a normal level, or below a threshold specified in another manner.

One embodiment may present content in such portions if such presentation does not elicit a touch input from the user in such portions. Another embodiment may not present any type of content in such portions regardless of whether the content elicits a touch input from the user in such portions.

Either way, the illustrative embodiments have to modify a UI layout of the content such that at least those UI elements in the UI layout, which require touch interaction, and which are positioned in a grid cell where the sensitivity is below the pre-determined threshold, are repositioned away from the cell with unacceptable sensitivity to a cell with acceptable sensitivity. Unacceptable sensitivity is sensitivity below the pre-determined threshold. Acceptable sensitivity is sensitivity at or above the pre-determined threshold.

One embodiment analyzes a UI layout presented by a presenting application. A presenting application is any application that sends content arranged in a UI layout for presentation on the screen according to the UI layout. A UI element is a component of the UI layout. For example, a UI layout can be an arrangement of style-sheets on a webpage, and a UI element can be a button or a checkbox on a style-sheet.

These examples of UI layout and UI elements are not intended to be limiting. From this disclosure, those of ordinary skill in the art will be able to conceive many other UI layouts and UI elements suitable for a particular type of interface device and the same are contemplated within the scope of the illustrative embodiments.

Upon analysis, the embodiment identifies that part of the UI layout which will lie in a grid cell with unacceptable sensitivity. The embodiment modifies the UI layout, to produce a modified UI layout, in which the embodiment repositions that part of the UI layout to another cell with acceptable sensitivity. In one embodiment, the part of the UI layout, which will lie in a grid cell with unacceptable sensitivity, includes a UI element with which a user may interact using a touch gesture.

In such an embodiment the presenting application is not involved in the modification of the UI layout. In other words, the presenting application only sends, and continues to send, the UI layout without regard to screen sensitivities of a particular screen on which the UI layout is going to be presented. The embodiment modifies the UI layout as close as possible to the rendering buffer in the data processing system with which the concerned screen is coupled.

Such a manner of modifying the UI layout is particularly useful when the presenting application resides on a different data processing system, such as a server, and communicates over a data network with the data processing system, such as a client, where the embodiment is executing. It is possible that the presenting application is presenting the UI layout to several screens on several clients, and the UI layout should not be disturbed or modified for a particular issue with the sensitivity of a particular screen at a particular client.

In another embodiment, after the embodiment modifies the UI layout, the embodiment sends the information about the acceptable and unacceptable areas of the screen to the presenting application. Such sent the information is also interchangeably referred to herein as a feedback instruction. The presenting application updates the UI layout such that the future versions of the UI layout avoid presenting content or UI elements in the unacceptable areas of the screen.

In one embodiment, the modified UI layout is also sent to the presenting application along with the information about the acceptable and unacceptable areas of the screen to the presenting application. The presenting application can update the UI layout using the modified UI layout as a guideline.

In another embodiment, the embodiment does not generate a modified UI layout, but upon analysis of a UI layout received from a presenting application, provides the information about the acceptable and unacceptable areas of the screen to the presenting application. The presenting application updates the UI layout to avoid presenting content or UI elements in the unacceptable areas of the screen now and in the future, and resends the updated UI layout to the embodiment.

Such manners of modifying and updating the UI layout are particularly useful when the presenting application resides on the same data processing system, such as a mobile device, where the embodiment is executing. In such cases, the presenting application is generally presenting the UI layout to a single screen—the screen of the mobile device, and the UI layout can be modified or updated for a particular issue with the sensitivity of a particular screen at a particular client.

An embodiment performs the sensitivity measurements from time to time or upon certain events. When the sensitivity information changes, causing a change in the acceptable and unacceptable areas of the screen, the UI layout can be modified, updated, or both, in response to such changes in the sensitivity information. When an embodiment communicates the sensitivity information to a presenting application, the embodiment can also send updated sensitivity information to the presenting application so that the presenting application may update the UI layout accordingly.

In this manner one or more embodiments analyze the screen rot on a screen of a given device. The analysis also identifies UI layouts and UI elements that are positioned in the areas of unacceptable sensitivity on the screen. The analysis also identifies and/or interacts with the presenting applications that position those UI elements in the areas of unacceptable sensitivity.

An embodiment sends the screen rot or the measured sensitivity information to a repository over a data network. For example, for a given screen of a device where screen rot is being managed in a manner described herein, one embodiment sends a device identifier, a device type, a sensitivity measurement, a presenting application identifier, a UI layout information, a UI element information, a user's preference, or some combination thereof, to the repository. When many devices are executing implementations of the embodiment, many devices contribute similar data to the repository, resulting in a variety of devices, device types, presenting applications, UI elements, and screen rot information getting collected in the repository.

One embodiment also collects information about a manner in which a touchscreen is used in a device. Such information includes data about the UI elements that occupy a grid cell, and their frequency of occupying the grid cell. The embodiment stores this usage pattern information in the repository as well. When several devices are executing implementations of an embodiment, such usage pattern information can be collected from several users of several screens.

The variety of data collected in the repository in this manner is collectively referred to herein as screen usage data. Over time, an analysis of the screen usage data can indicate whether certain UI elements, such as application launch icons to launch certain applications, are so heavily used or touched that the grid cell where they reside experiences screen rot as a result.

For example, one analysis of the screen usage data can reveal a particular characteristic of the UI elements that are most responsible for screen rot. As some non-limiting examples, an example analysis may show that red icons tend to receive more forceful touches than yellow icons; or animated icons tend to receive more touch interactions than unanimated icons; or that icons in the top right corner receive more frequent touches than the icons in the lower left corner of the touchscreen.

Accordingly, the example analysis produces a UI design guideline, feedback, or directive to a UI design tool. Using the guideline, a UI design tool avoids using the UI characteristic that is associated with more than a threshold amount or number of screen rots according to the screen usage data of the repository. Conversely, the UI design tool increases a use of that UI characteristic which is associated with less than another threshold amount or number of screen rots according to the screen usage data of the repository.

As another example, another analysis of the screen usage data may reveal a user preference that is uniquely related to a particular pattern or position of screen rot. As some non-limiting examples, an example analysis may show that screen rot is predominantly on the top right corner of the screen for right handed users, and the top left corner of the screen for left handed users; or that the screen rot is more scattered on the screen for adult users than for children; or that users from different regions or the users of different languages tend to have different screen rot patterns.

Accordingly, the example analysis produces a UI design guideline, feedback, or directive to a UI design tool. Using the guideline, a UI design tool produces alternative UI designs, from which a UI design can be selected at the device according to a preference of a user who might be using the device. The guideline from the embodiment allows the UI design tool to configure the alternative UI designs such that the UI designs are switchable according to the changing users or changing user preferences.

As another example, another analysis of the screen usage data may reveal that the usability of a UI design changed when the device-side application modified the UI layout or a presenting application changed the UI layout based on a feedback from the device-side application. In some cases, the modified UI layout can increase the usability of the UI layout and in other cases the modifications can decrease the usability. As some non-limiting examples, an example analysis may show that moving a "submit" button from the top right corner of the screen—where screen rot exceeded a threshold—to the middle of the bottom of the UI layout caused the users to increase the usage of the UI layout, or caused a faster input on the UI layout. This type of information includes a number of use, timing of use, and other similarly usable information, and is a part of the usage pattern information that is stored in the repository.

Accordingly, the example analysis produces a UI design guideline, feedback, or directive to a UI design tool. Using the guideline, a UI design tool produces one or more UI designs, which incorporate a modification from a modified UI layout to improve the usability of the UI design.

In some cases, multiple UI designs may be configured to address other reasons of screen rot. For example, when a UI element is placed in a fixed position each time a UI layout is rendered, the placement of the UI element invites touches at the same touch point on the screen leading to screen rot at those touch points. Screen savers have been known to prevent screen burn-in due to a display of the same image in the same position for a length of time. However, a screen saver overlays a presenting application's UI layout such that when the screen saver is active, the user cannot interact with the UI layout.

According to an embodiment, multiple versions of a UI layout can be created using a guideline from an analysis of the screen usage data. One version of the UI layout is different from another version of the UI layout in that one or more UI elements in one of the versions are displaced or shifted relative to their corresponding one or more UI elements in the other version.

For example, a version of the UI may shift a UI element by a millimeter in a direction after each week of usage. A mathematical expression can be built into the UI design to map the trajectory of movement of a UI element over a period of time in this manner. An embodiment provides a guideline for a rate of shifting, a UI element that should be shifted, a start and finish location of the UI element for the shifting, and other similarly purposed guidelines. By shifting the UI elements in this manner, a gradual change of the UI can be effected on the touchscreen over a prolonged period, while maintaining user interactivity with the UI layout—unlike a screen saver, and without subjecting the user to a drastic usability change due to a changed UI design.

These examples of analyses and guidelines are not intended to be limiting. From this disclosure, those of ordinary skill in the art will be able to conceive many other types of analyses that can be performed and many other guidelines that can be extracted from a repository of screen usage data, and the same are contemplated within the scope of the illustrative embodiments. The described example analyses and other analyses operating in a similar manner are performable using existing business intelligence or data-mining tools on the screen usage data of the repository described herein.

A method of an embodiment described herein, when implemented to execute on a device or data processing system, comprises substantial advancement of the functionality of that device or data processing system for user interface design to mitigate device deterioration. For example, prior-art UI design tools do not presently have access to a repository of screen usage data in the manner described herein. Accordingly, guidelines such as those produced from an embodiment are not available to presently used UI design tools. An embodiment monitors the changing sensitivity information of the various portions of a screen. An embodiment collects screen usage information from a variety of devices for a variety of users and UI layouts. An embodiment further analyzes the collected screen usage data to produce one or more guidelines for a UI design tool to produce one or more UI designs. The UI designs produced in this manner avoid or mitigate screen rot on touchscreens. Such manner of assisting a UI design process for screen rot-aware UI design is unavailable in presently available devices or data processing systems. Thus, a substantial advancement of such devices or data processing systems by executing a method of an embodiment is achieved by designing UI layouts which reduce or mitigate the UI layout-based causes of screen rot.

The illustrative embodiments are described with respect to certain UI layouts, UI elements, screens, interface devices, grid, cells, sensitivity levels, screen rot levels, presenting applications, modifications, feedback instructions, screen usage data, analyses, guidelines, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
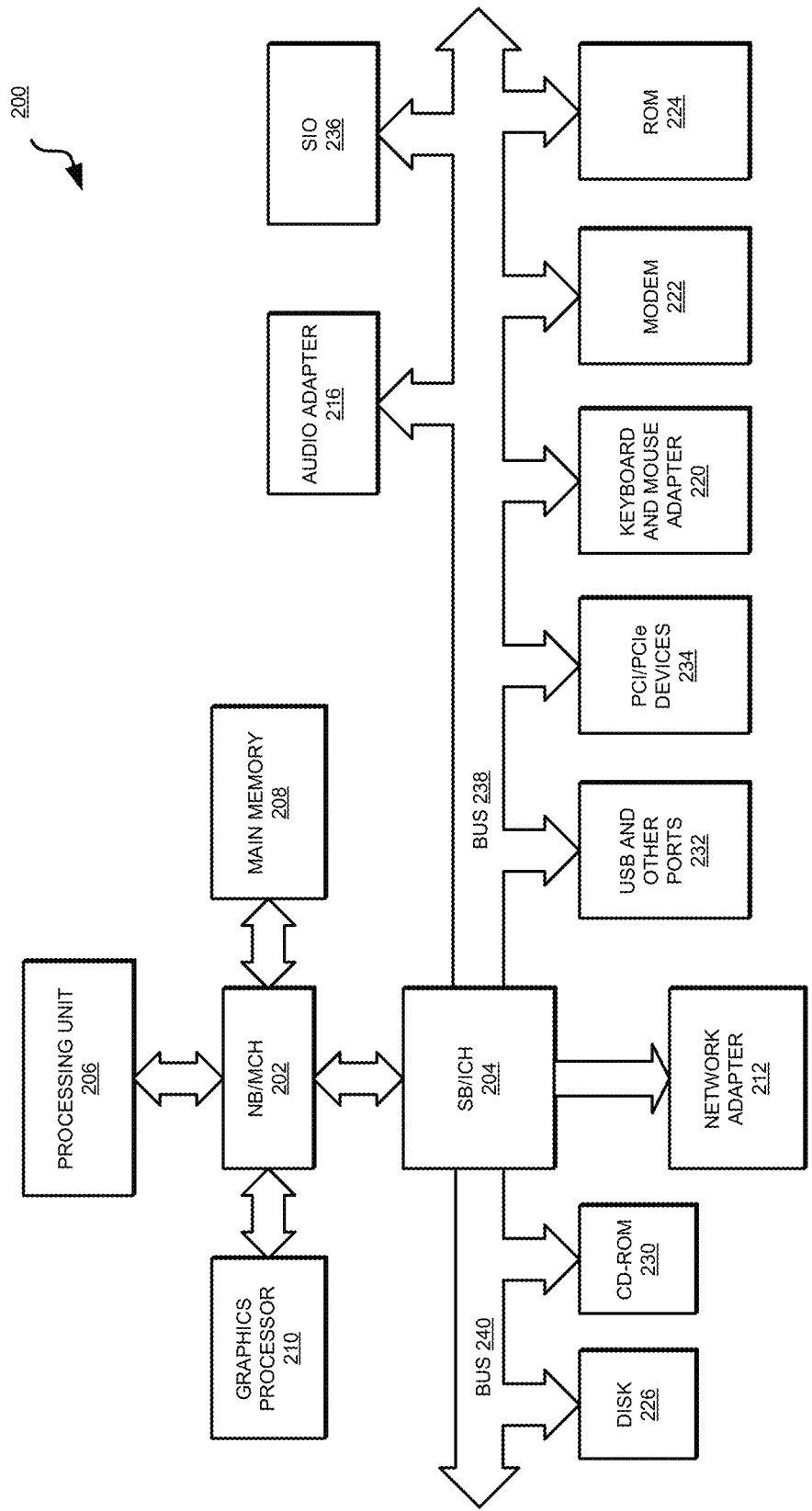
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Screen 133 in device 132 is an example of an interface device contemplated herein, such as a touchscreen. Device-side application 134 implements an embodiment described herein. Presenting application 136 executes in device 132 and provides a UI layout for rendering on screen 133. Device-side application 134 modifies such UI layout, or causes presenting application 136 to update the UI layout in a manner described herein. Social media client 138 is an example method by which a user of device 132 can share the user's experience as to UI layouts, screen rot, and other types of screen usage data as described herein. Presenting application 105 provides a UI layout over network 102 for rendering on screen 133. Device-side application 134 modifies such UI layout, or causes presenting application 105 to update the UI layout in a manner described herein. Device-side application 134 contributes an identifier of device 132, a device type of device 132, a sensitivity measurement on screen 133, an identifier of presenting application 136 or 105, a description of a UI layout presented on screen 133, a description of a UI element presented on screen 133, a preference of a user of device 132, or some combination of these and other similarly purposed information, to screen usage data 109 in repository 108. Application 107 implements an embodiment for analysis of screen usage data 109 and providing guidelines to UI design tool 113 as described herein.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications.

Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system such as AIX® (AIX is a trademark of International Business Machines Corporation in the United States and other countries), Microsoft® Windows® (Microsoft and Windows are trademarks of Microsoft Corporation in the United States and other countries), Linux® (Linux is a trademark of Linus Torvalds in the United States and other countries), iOS™ (iOS is a trademark of Cisco Systems, Inc. licensed to Apple Inc. in the United States and in other countries), or Android™ (Android is a trademark of Google Inc., in the United States and in other countries). An object oriented programming system, such as the Java™ programming system, may run in conjunction with the operating system and provide calls to the operating system from Java™ programs or applications executing on data processing system 200 (Java and all Java-based trademarks and logos are trademarks or registered trademarks of Oracle Corporation and/or its affiliates).

Instructions for the operating system, the object-oriented programming system, and applications or programs, such as application 107 and device-side application 134 in FIG. 1, are located on storage devices, such as hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Figure 3:
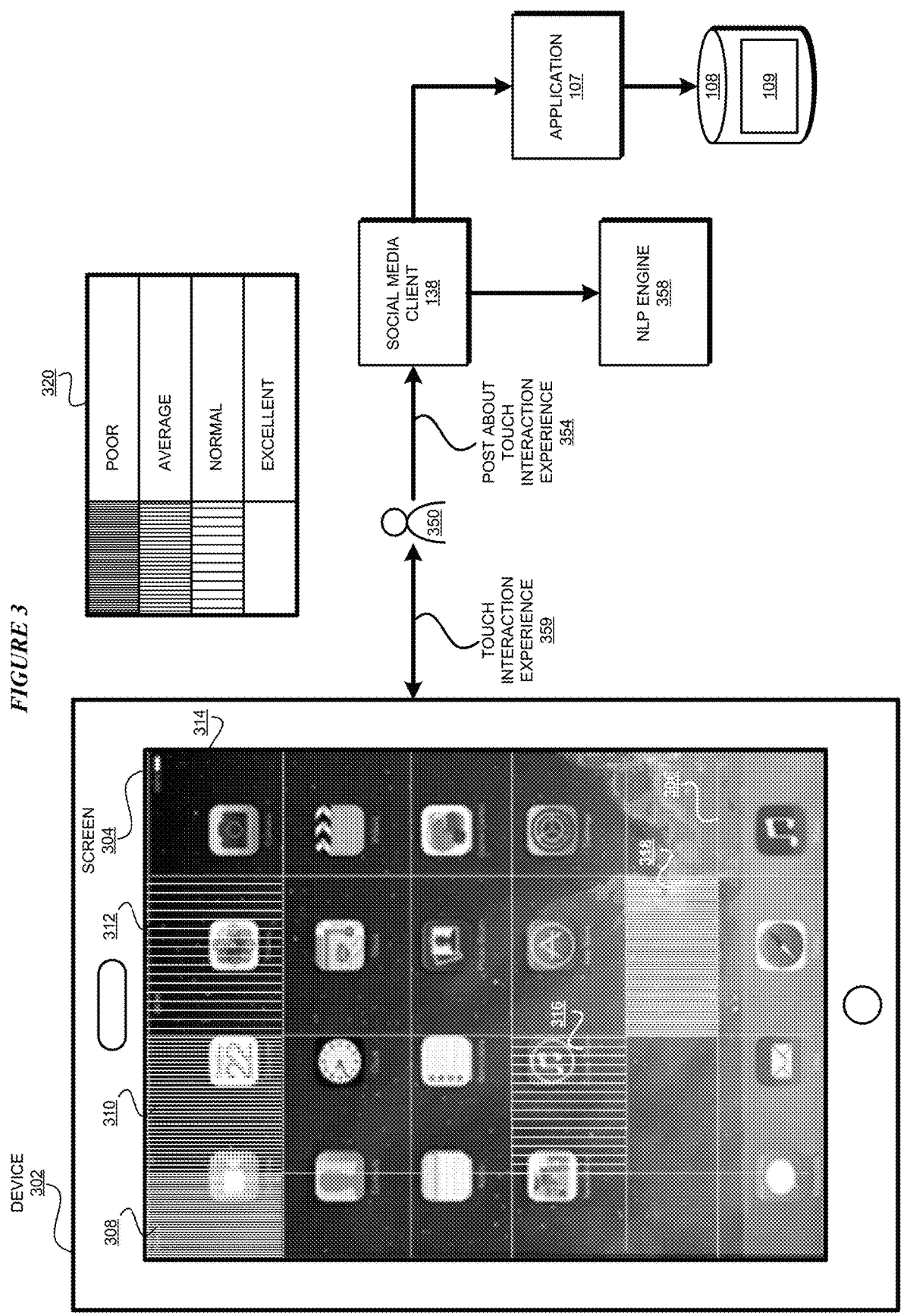
FIG. 3 depicts a block diagram of an example configuration for measuring and presenting screen sensitivity in accordance with an illustrative embodiment.

With reference to FIG. 3, this figure depicts a block diagram of an example configuration for measuring and presenting screen sensitivity in accordance with an illustrative embodiment. Device 302 is an example of device 132 in FIG. 1. Screen 304 is an example of screen 133 in FIG. 1.

Grid lines form grid 306 as shown. Grid 306 may be invisible or virtual in one embodiment and visible in another embodiment. Cells 308, 310, 312, 314, 316, and 318 are example cells selected from grid 306 to describe the operations of an embodiment.

The embodiment measures the sensitivity in some or all of the cells in grid 306. Only as an example, suppose that according the sensitivity measurements in the various grid cells, the sensitivity in cell 308 is poor, the sensitivity in cell 310 is average, the sensitivity in cell 312 is normal, and the sensitivity in cell 314 is excellent. Similarly, the sensitivity in cell 316 is normal, and the sensitivity in cell 318 is poor. Legend 320 describes the example sensitivities depicted in FIG. 3.

An embodiment perceptibly represents the measured sensitivities on screen 304 to a user. For example, according to such an embodiment, grid 306 is visible on screen 304, and cells 308, 310, 312, 314, 316, and 318 are shaded or colored as shown. Legend 320 may be shown on screen 304 depending on the implementation.

When presented with such a perceptible representation of the sensitivities of the various regions of the screen, the user becomes informed about the diminishing capabilities of the screen, which the user might not otherwise comprehend. Furthermore, if the user has a choice and an ability to rearrange the UI elements on the screen, such a perceptible representation allows the user to rearrange the UI elements with the knowledge of acceptable and unacceptable screen rot regions.

An embodiment stores the measured sensitivities on screen 304 as a part of screen usage data 109 in repository 108. For example, according to such an embodiment, the measured sensitivities in the various cells in grid 306 and the cell positions on screen 304 are stored as the measured sensitivity information portion of screen usage data 109.

User 350 of device 302 has touch interaction experience 352 with screen 304. User 350 posts social media message 354 on social media client 138 about experience 352. Application 107 extracts or receives post 354, such as from a social media server operating with social media client 138. As an example, application 107 uses Natural language Processing (NLP) engine 358 to extract information that is storable as screen usage data 109 or a portion thereof in repository 108.

Note that the drawings of this disclosure are limited to black and white drawings only to meet the drawings requirements of the United States Patent and trademark Office and not to imply any limitation thereto. When implemented in a color supporting device and screen, the depicted shading can be replaced with different colors, as described in this disclosure. Similarly, the shading or the colors can be replaced or augmented with animations, sounds, and other features as also described herein, within the scope of the illustrative embodiments.

Figure 4:
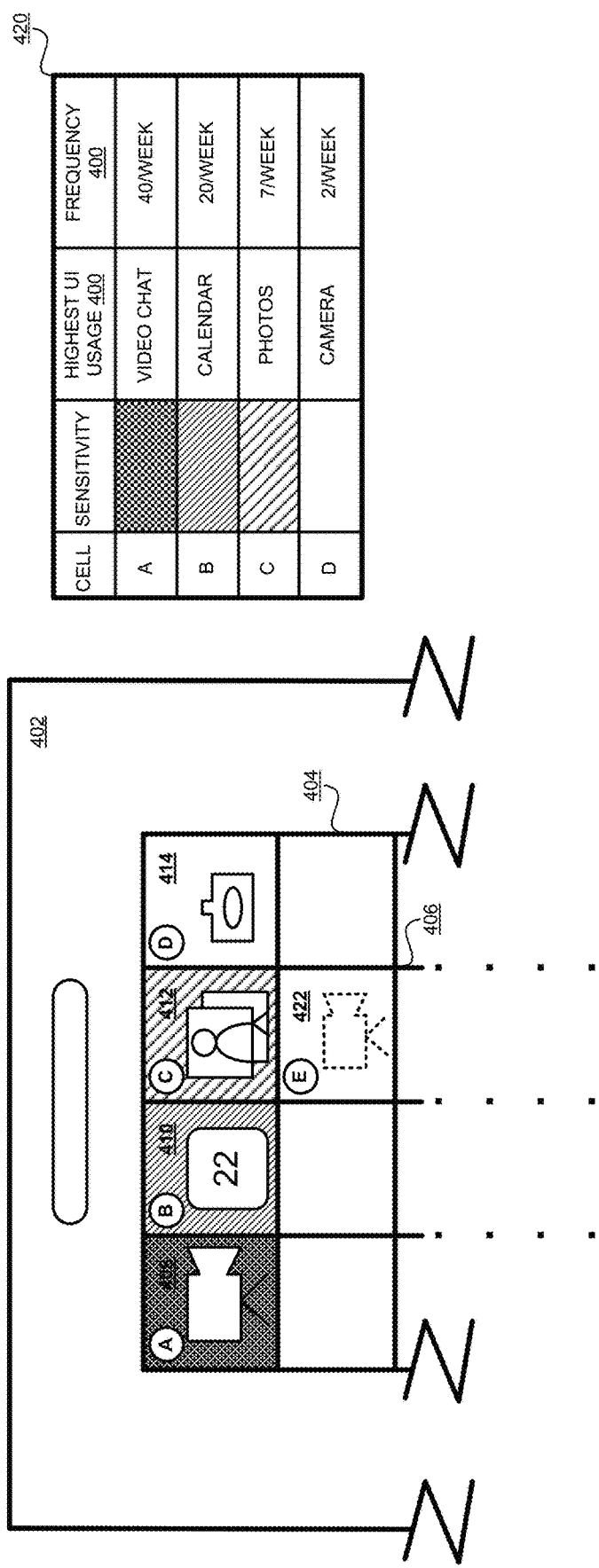
FIG. 4 depicts a block diagram of a configuration for representing screen usage data in accordance with an illustrative embodiment.

With reference to FIG. 4, this figure depicts a block diagram of a configuration for representing screen usage data in accordance with an illustrative embodiment. Device 402 is an example of device 302 in FIG. 3. Screen 404 is an example of screen 304 in FIG. 3. Cells 408 (labeled cell "A"), 410 (labeled cell "B"), 412 (labeled cell "C"), and 414 (labeled cell "D") correspond to cells 308, 310, 312, and 314, respectively, in FIG. 3.

As described with respect to FIG. 3, the measured sensitivities of cells 408, 410, 412, and 414 are represented using shading of corresponding weights. In this figure, an embodiment is shown to present to the user statistical information about the usage of the various cells. Legend 420 and grid 406 are perceptibly presented on screen 404 to the user.

For example, legend 420 shows that cell A has poor sensitivity, and that area of the screen is most frequently occupied by an UI element to launch a video chat application approximately 40 times per week. Similarly, legend 420 shows that cell B has average sensitivity, and that area of the screen is most frequently occupied by an UI element to launch a calendar application approximately 20 times per week. Likewise, legend 420 shows that cell C has normal sensitivity, and that area of the screen is most frequently occupied by an UI element to launch a photo album application approximately 7 times per week. Legend 420 shows that cell D has excellent sensitivity, and that area of the screen is most frequently occupied by an UI element to launch a camera application approximately 2 times per week.

When presented with this information, the user is enabled to reposition the video chat launching UI element from cell A to another cell with better sensitivity. For example, the user can move the video chat application launching UI element from cell A to cell 422 (labeled "E"), which has excellent sensitivity according to the weight of the shading (or absence thereof) in cell E.

An embodiment modifies a UI layout in a similar manner. Of example, suppose that a presenting application were presenting the UI layout with the video chat application launch UI element in cell A. An embodiment analyzes the UI layout, determines that cell A has unacceptable sensitivity, determines that the UI element in cell A elicits or requires a touch interaction from the user, and repositions the video chat application launch UI element to cell E.

An embodiment stores the information of the modified UI layout in repository 108. For example, an Identifier of the UI element that is moved from cell A to cell E, the locations of source cell A and destination cell E, an identifier of a presenting application associated with that UI element, and other similar information forms a part of screen usage data 109 in repository 108.

Figure 5:
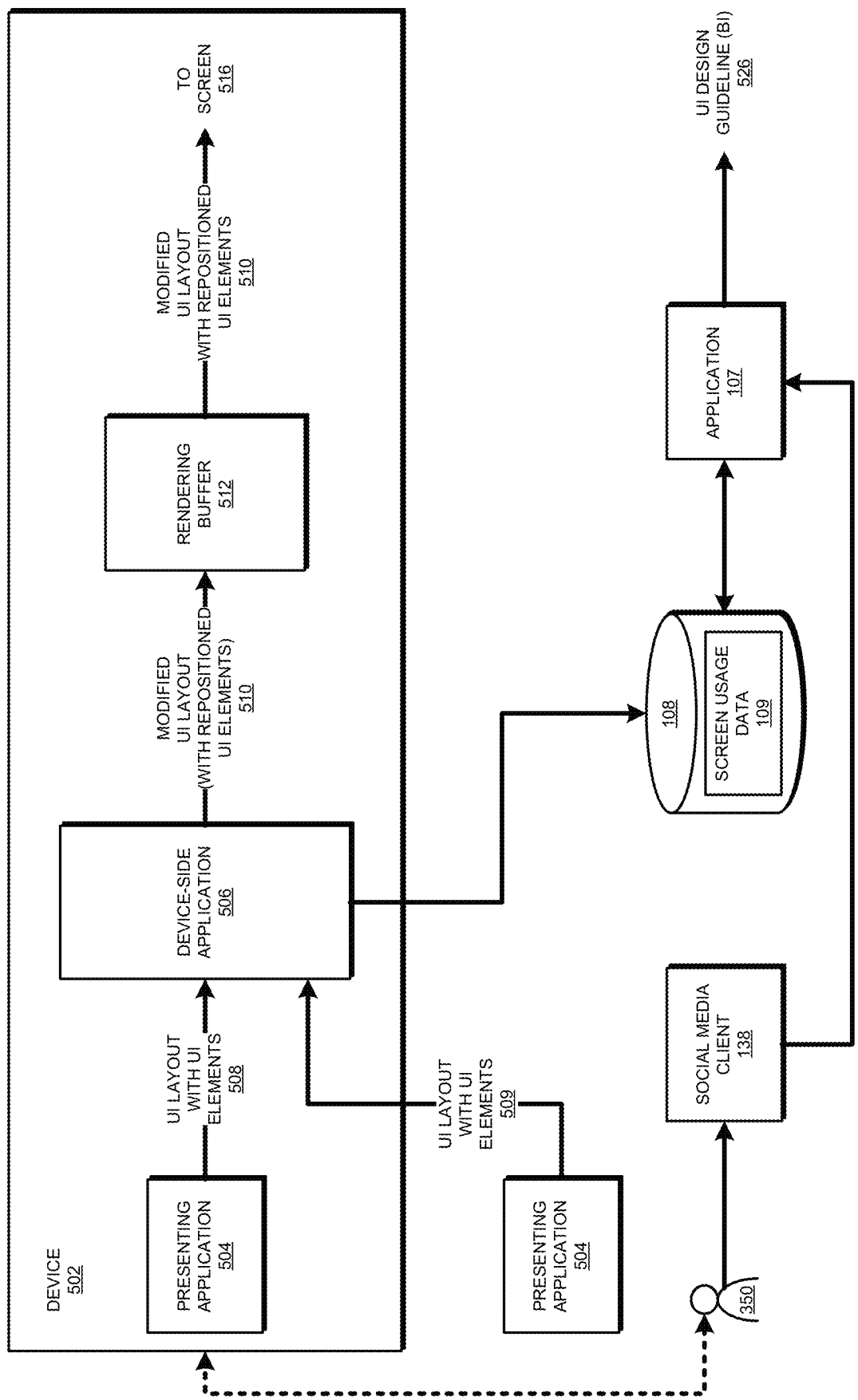
FIG. 5 depicts a block diagram of an example configuration for reconfiguring a user interface according to a deterioration of an interface device in accordance with an illustrative embodiment.

With reference to FIG. 5, this figure depicts a block diagram of an example configuration for reconfiguring a user interface according to a deterioration of an Interface device in accordance with an illustrative embodiment. Device 502 is an example of device 302 or 402 in FIG. 3 or 4, respectively. Presenting application 504 is an example of presenting application 136 in FIG. 1. Presenting application 505 is an example of presenting application 105 in FIG. 1. Device-side application 506 is an example of device-side application 134 in FIG. 1.

Presenting application 504 sends UI layout 508 to device-side application 506. UI layout 508 includes a set of UI elements. Alternatively, presenting application 505 sends UI layout 509 to device-side application 506. UI layout 509 includes a set of UI elements. In some cases, presenting application 504 and presenting application 505 may both send parts of a complete UI layout in this manner.

Device-side application 506 modifies the UI layout received from presenting application 504, presenting application 505, or both. Device-side application 506 creates and outputs modified UI layout 510 to rendering buffer 512 in a manner described herein. Modified layout 510 includes one or more repositioned UI elements as described elsewhere in this disclosure.

Device-side application 506 stores a description of modified UI layout 510 in repository 108. For example, device-side application 506 stores a set of UI elements, their original positions in UI layout 508, their modified positions in modified UI layout 510, an identifier of presenting application 504, an identifier and/or type of device 502, or a combination of these and other similarly purposed information as a part of screen usage information 109 in repository 108.

Modified UI layout with repositioned UI elements 510 is loaded in rendering buffer 512. In case of a touchscreen type interface device, rendering buffer 512 is a memory that drives the display of content on touchscreen 516. When other types of interface devices are used in place of screen 516, a structure corresponding to rendering buffer 512 that is suitable for that type of interface device can be used in a similar manner within the scope of the illustrative embodiments.

User 350 interacts with device 502. User 350 posts a message about an experience in using screen 516, such as an ease of difficulty with the screen rot on screen 516, a likability or dislike for modified UI layout 510, and other such information on social media client 138. Application 107 receives or extracts the message from the social media, processes the message in a manner described herein, and stores the processed information as a part of screen usage information 109 in repository 108. Application 107 analyzes screen usage information 109 using one or more business intelligence methods to produce one or more UI design guideline 526 for UI design tool 113.

Figure 6:
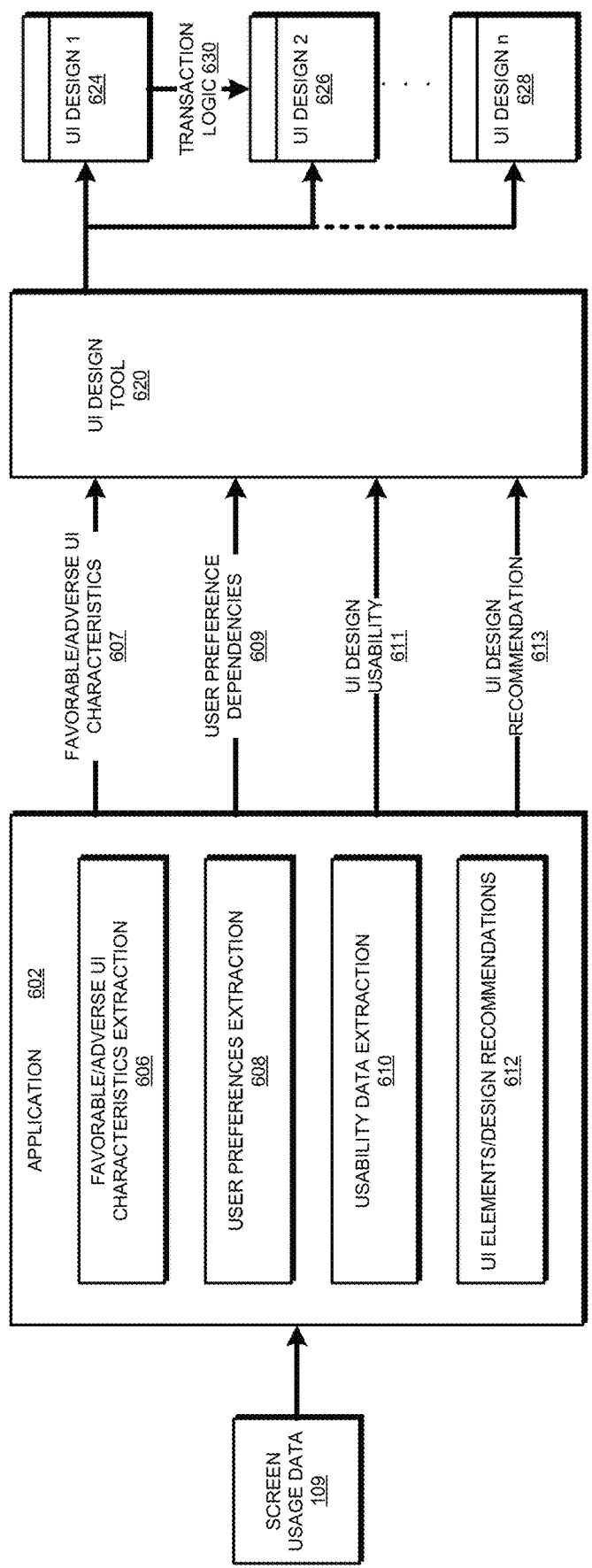
FIG. 6 depicts a block diagram of an example configuration for user interface design to mitigate device deterioration in accordance with an illustrative embodiment.

With reference to FIG. 6, this figure depicts a block diagram of an example configuration for user interface design to mitigate device deterioration in accordance with an illustrative embodiment. Application 602 is an example of application 107 in FIG. 1.

Application 602 receives screen usage data 109 as input. Component 606 identifies a UI element that occurs in screen usage data 109 of at least a threshold number of devices. Component 606 extracts one or more favorable or adverse characteristic of the UI element. In a similar manner, component 606 can be configured to identify a UI element that occurs in screen usage data 109 corresponding to at least a threshold number of original or modified UI layouts, user experiences, or presenting applications. Component 606 extracts one or more favorable or adverse characteristic of the UI element that is identified according to any one or more such criteria.

Some example favorable characteristics of a UI element include but are not limited to a color, size, placement, or animation of the UI element which results in a less than a threshold number of instances of screen rot where the UI element is the cause of the screen rot. Some example adverse characteristics of a UI element include but are not limited to a color, size, placement, or animation of the UI element which results in a threshold number of instances or more of screen rot where the UI element is the cause of the screen rot.

Application 602 outputs the favorable or adverse characteristics of the UI element as guideline 607 to improved UI design tool 620. Any number of guidelines of the type of guideline 607 can be produced from application 602 in a similar manner.

Improved UI design tool 620 is an improvement upon UI design tool 113 according to an embodiment. For example, improved UI design tool 620 is configured to accept guideline 607 and produce UI design 624, which incorporates a favorable UI characteristic, avoids an adverse UI characteristic, or both, according to guideline 607.

In a similar manner, component 608 extracts one or more user preference that occurs in screen usage data 109 corresponding to at least a threshold number of original or modified UI layouts, user experiences, or presenting applications relative to screen rot information. Some example user preferences associated with screen rot include but are not limited to a left or right handedness of the user as relates to a type or location of screen rot, an age or gender of the user as relates to a type or location of screen rot, a region or locale of a user as relates to a type or location of screen rot, and a language or culture of a user as relates to a type or location of screen rot.

Application 602 outputs the user preference dependencies of screen rot as guideline 609 to improved UI design tool 620. Any number of guidelines of the type of guideline 609 can be produced from application 602 in a similar manner.

Improved UI design tool 620 is an improvement upon UI design tool 113 according to another embodiment. For example, improved UI design tool 620 is configured to accept guideline 609 and produce UI design 624, which positions a UI element according to a user preference dependency of guideline 609. As another example, according to another embodiment, improved UI design tool 620 is configured to accept guideline 609 and produce more than one UI designs, to wit, UI design 624, 626, and 628, each of which arranges a UI element differently according to a different user preference dependency of guideline 609.

In a similar manner, component 610 extracts usability information that occurs in screen usage data 109 corresponding to at least a threshold number of original or modified UI layouts, user experiences, or presenting applications relative to screen rot information. For example, the usability of a modified UI design may be better than the usability of a corresponding original UI for one presenting application. As another example, the usability of a modified UI design may be worse than the usability of a corresponding original UI for another presenting application.

Application 602 outputs as guideline 111 a characteristic of a UI design whose usability exceeds a threshold metric of usability. Any number of guidelines of the type of guideline 611 can be produced from application 602 in a similar manner.

Improved UI design tool 620 is an improvement upon UI design tool 113 according to another embodiment. For example, improved UI design tool 620 is configured to accept guideline 611 and produce UI design 624, which uses the UI design characteristic of greater than the threshold usability metric according to guideline 611.

In this manner, any number of analytic components can be configured in application 602 to perform a variety of analytics on screen usage data 109 and produce a set of guidance for improved UI design tool 620. For example, component 612 extracts a UI design feature that is common to at least a threshold number of original or modified UI designs, which receives a greater than a threshold amount of touch interaction, and which causes a lower than a threshold amount of screen rot. Component 612 extracts such a feature as a design recommendation for other UI designs. Accordingly, application 602 outputs UI design recommendation guidance 613 to improved design tool 620, where the recommendation is to be followed.

Conversely, component 612 extracts a UI design feature that is common to at least a threshold number of original or modified UI designs, which receives a lower than a threshold amount of touch interaction, and which causes a greater than a threshold amount of screen rot. Component 612 extracts such a feature as an "avoid" design recommendation for other UI designs. Accordingly, application 602 outputs UI design recommendation guidance 613 to improved design tool 620, where the recommendation is to be avoided. Improved UI design tool 620 is configured according to an embodiment to accept guideline 613 as a UI design input, and produce UI design 624, which follows or avoids guideline 611, as the case may be.

Improved UI design tool 620 is further improved according to another embodiment where improved UI design tool 620 produces a set of UI designs 624, 626, and 628. According to this embodiment, improved UI design tool 620 also constructs transition logic 630, which transitions from UI design 624 to UI design 626 over a period, such as by shifting a UI element according to a trajectory in UI design 624 to result in UI design 626. The trajectory is coded into transition logic 630.

With reference to FIG. 7, this figure depicts a flowchart of an example process for user interface design to mitigate device deterioration in accordance with an illustrative embodiment. Process 700 can be implemented in application 602 in FIG. 6.

The application receives data describing a UI layout or design, one or more user preferences for using a UI layout or design, screen rot measurements, a device identifier, a device type, a presenting application identifier, or some combination thereof (block 702).

Alternatively, or in addition to the data of block 702, the application receives from social media a user's experience with a UI layout, a user preference for using a UI layout or design, an experience of a user with screen rot, or a combination thereof, on a device or device type (block 704). The application processes the data received in block 704, such as by using NLP, to extract data describing a UI layout or design, one or more user preferences for using a UI layout or design, screen rot measurements, a device identifier, a device type, a presenting application identifier, or some combination thereof (block 706). The application stores the data of block 702, 706, or both, in a repository (block 708).

The application analyzes the stored data to extract a UI characteristic that contributes to a screen rot in an adverse manner, in a favorable manner, or both (block 710). The application outputs a result of the analysis of block 710 as a guideline, which forms UI design input 712. In one embodiment, the application ranks the extracted UI characteristics (block 714). When the extracted characteristics are ranked, UI design input 712 includes guidelines with those ranked characteristics.

The application analyzes the stored data to determine a screen rot's dependency upon a user's profile, preference, or usage pattern (block 716). The application outputs a result of the analysis of block 716 as a guideline, which forms UI design input 718.

The application analyzes the stored data to determine a change in a usability of a UI layout when the UI layout is modified to accommodate screen rot in a portion of a touchscreen (block 720). The application outputs a result of the analysis of block 720 as a guideline, which forms UI design input 722.

Proceeding in this manner, any number and types of analyses can be made in process 700 and any number of corresponding guidelines sent as UI design inputs from process 700. For example, the application analyzes the stored data to determine a design practice that should be followed or avoided in future UI designs (block 724). The application outputs a result of the analysis of block 724 as a guideline, which forms UI design input 726. The application ends process 700 thereafter.

Thus, a computer implemented method, system or apparatus, and computer program product are provided in the illustrative embodiments for user interface design to mitigate device deterioration. Where an embodiment or a portion thereof is described with respect to a type of device, the computer implemented method, system or apparatus, the computer program product, or a portion thereof, are adapted or configured for use with a suitable and comparable manifestation of that type of device.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for improving a future user interface (UI) design, the method comprising:

analyzing, using a processor and a memory of a data processing system, a set of data, a data in a first subset of the set of data including (i) a description of a UI layout that includes a description of a UI element positioned in a first area of a touch-sensitive device, the first area having a first sensitivity to touch, wherein the first sensitivity is below a level of sensitivity, and (ii) a second area of the touch-sensitive device, the second area having a second sensitivity to touch, wherein the second sensitivity is at least equal to the level of sensitivity;

extracting a first visual characteristic of the UI element, wherein a threshold number of data in the first subset include some UI element with the first visual characteristic, wherein the first visual characteristic includes at least one member selected from a set of (i) a color (ii) and an animation of the UI element;

determining, for the first area in each data in the first subset, that the first visual characteristic causes a sensitivity to reduce to below the level of sensitivity according to an analysis of screen usage data, wherein the analysis indicates that UI elements with the first visual characteristic were heavily used or touched as a result of the first visual characteristic; and constructing, responsive to the determining, an instruction for a UI design tool, the instruction causing the UI design tool to move a UI element in a future UI design from the first area to the second area and replacing use of the first visual characteristic of the UI element with a second visual characteristic in the future UI design according to the analysis of screen usage data, wherein the analysis indicates that UI elements with the second visual characteristic were not as heavily used or touched, as a result of the second visual characteristic, as the UI elements with the first visual characteristic.

2. The method of claim 1, further comprising:
constructing a second instruction for the UI design tool, wherein the second instruction causes the UI element in the future UI design to be rendered at the first area and migrate to the second area over a period.

3. The method of claim 2, wherein the UI element of the future UI design migrates from the first area to the second area over the period incrementally, each increment of the migration occurring over a fraction of the period, wherein the UI element of the future UI design remains available to receive a touch gesture at each increment of the migration.

4. The method of claim 1, further comprising:
analyzing a user preference, wherein the user preference is used in a second threshold number of data in the first subset;
concluding, for the first area in each data in the first subset, that the user preference causes the sensitivity to reduce to below the level of sensitivity; and
constructing, responsive to the concluding, a second instruction for the UI design tool, the second instruction causing the UI design tool to move the UI element in the future UI design to the second area when the future UI design is used with the user preference.

5. The method of claim 4, further comprising:
further causing, responsive to the second instruction, the UI design tool to keep the UI element in the future UI design in the first area when the future UI design is used with a different user preference.

6. The method of claim 4, wherein the user preference is a handedness of a user of the future UI design.

7. The method of claim 4, wherein the user preference is an age of a user of the future UI design.

8. The method of claim 4, wherein the user preference is a language preference of a user of the future UI design.

9. The method of claim 1, further comprising:
analyzing a usability factor, wherein the usability factor is a measurement of a change in a usability of the UI layout when the UI element is moved from the first area to the second area;
concluding that the usability factor exceeds a threshold value of usability change; and
constructing, responsive to the concluding, a second instruction for the UI design tool, the second instruction causing the UI design tool to move the UI element in the future UI design to the second area to increase a usability of the future UI design.

* * * * *